United States Patent Office 3,019,018
Patented Jan. 30, 1962

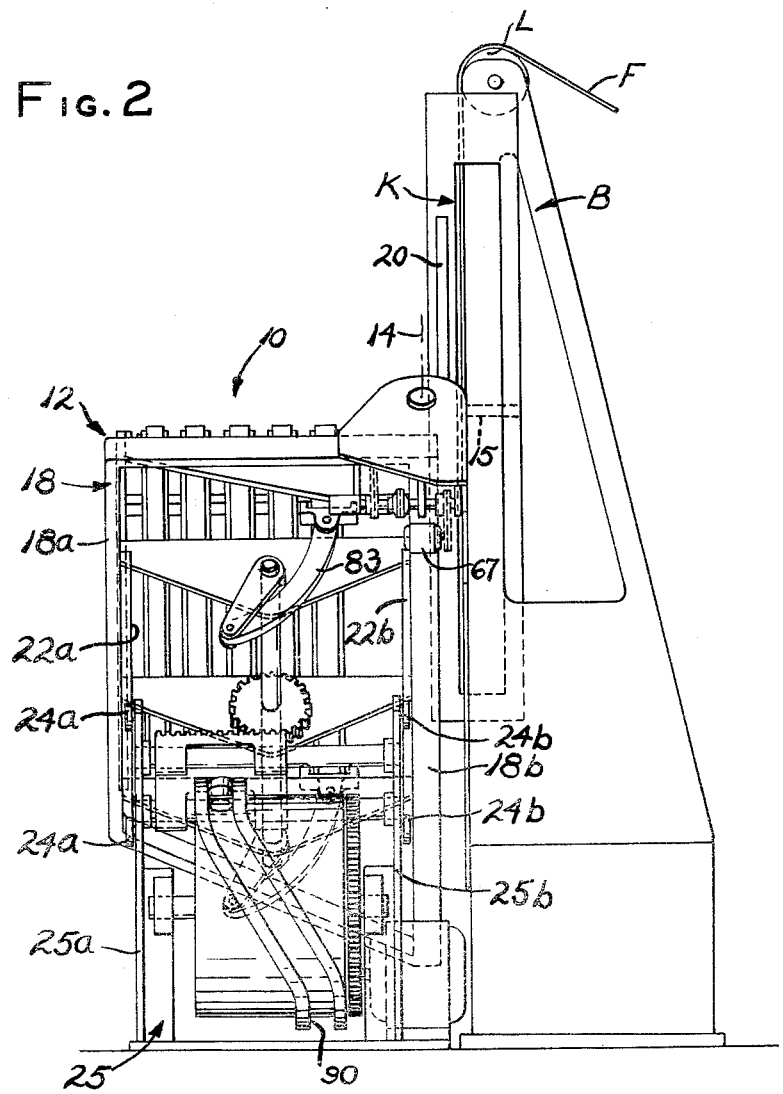

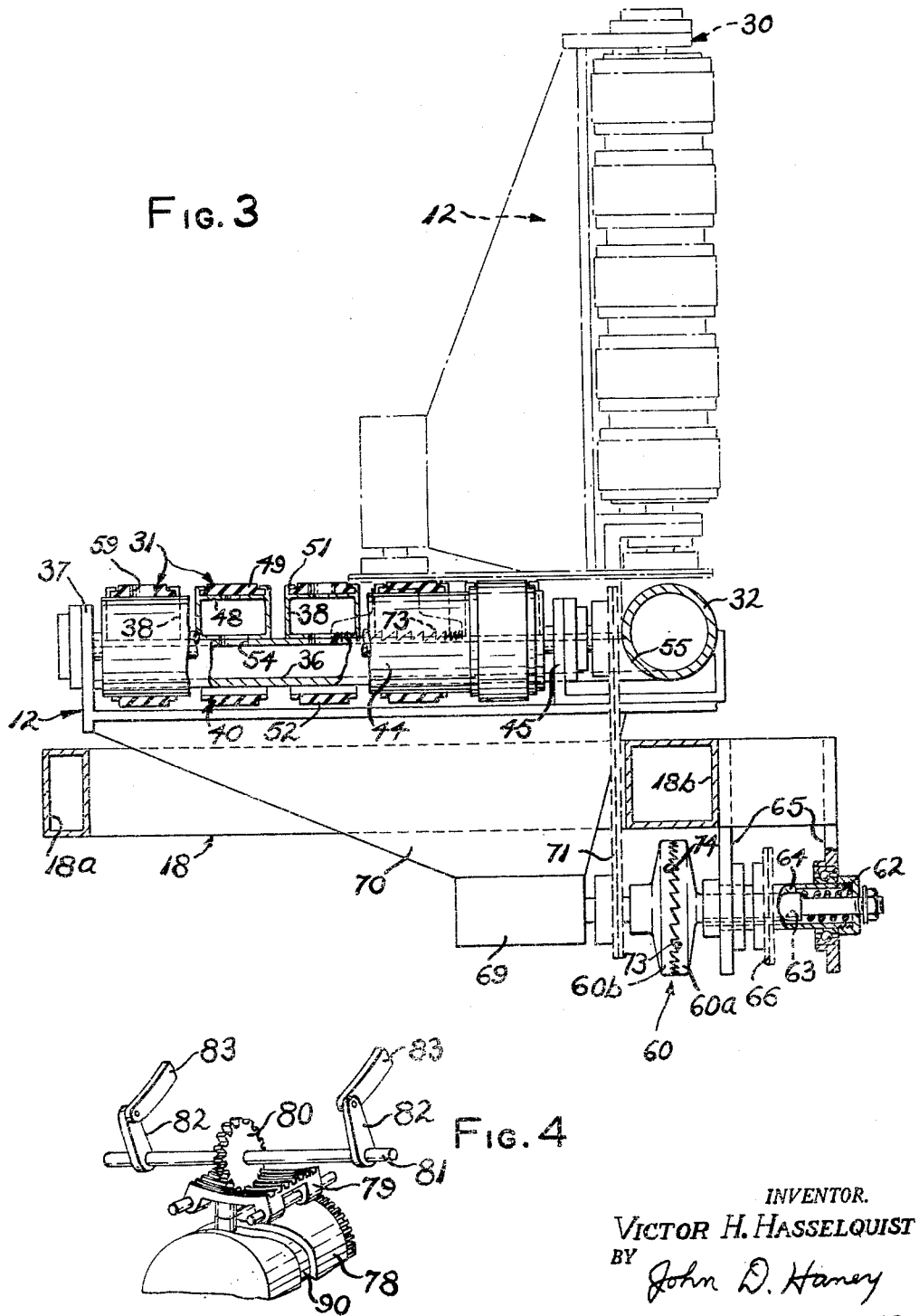

3,019,018
TRANSFER MECHANISM FOR BIAS CUT
FABRIC PIECES
Victor H. Hasselquist, Akron, Ohio, assignor to The B. F.
Goodrich Company, New York, N.Y., a corporation of
New York
Filed Nov. 28, 1960, Ser. No. 72,194
6 Claims. (Cl. 271—74)

This invention relates to mechanism for transferring pieces of bias cut fabric from a bias cutter to receiving equipment in which such pieces are further processed. More particularly, the transfer mechanism of this invention is adapted for operation with vertical bias cutters as used in the tire building industry. The transfer mechanism functions to receive or automatically "catch" a fabric piece in a vertical position as it is cut on such bias cutter. The mechanism then revolves this cut piece to another plane, usually at right angles to the cutting plane, where the piece is then transferred to other receiving equipment. The mechanism has special utility in the preparation of tire ply stock wherein rubber coated ply stock with longitudinal weftless cords is bias cut into parallelogram shaped pieces, and then these pieces are spliced into a new strip suitable for tire plies in which the cords lie at a transverse angle to the length of the new strip. This transfer mechanism may be advantageously used to automatically bring the bias cut pieces into proper alignment for splicing.

The transfer mechanism of this invention is particularly designed to achieve accurate placement of the fabric pieces as it removes them from the bias cutter. The action of the transfer mechanism is positive and may be easily timed to operate accurately in proper sequence with both the bias cutter and the receiving equipment.

The transfer mechanism includes a belt assembly which is hinged along one longitudinal edge thereof on an axis parallel to the path traversed by the cutting knife of the bias cutter. This assembly may be swung into a vertical position about such axis to engage the fabric piece as it is cut by the knife. After cutting, the belt assembly is swung away from the vertical position about the same axis, and then operated to advance the piece to appropriate receiving equipment.

One special feature of this mechanism is that it is designed so that its operating position is automatically adjusted to conform to a change in the bias cutting angle of the bias cutter knife mechanism. Regardless of the cutting angle to which the bias cutter knife may be adjusted, the belt assembly is automatically adjusted so that its hinge axis remains parallel with the path traversed by the bias cutter knife. Accordingly, this mechanism insures that regardless of the bias angle of the pieces, the pieces are still delivered to the receiving equipment with the proper orientation. The automatic adjustment of the swinging belt assembly is accomplished without in any way disturbing the interrelationship of the drive components controlling the swinging belt assembly, or the timed sequence in which they operate.

A preferred transfer mechanism made in accordance with and embodying the invention is shown in the accompanying drawings as an example of how the invention may be practiced.

In the drawings:

FIG. 2 is an end elevation taken from the position indicated by the line 2—2 of FIG. 1;

FIG. 3 is a detail view approximately along the line 3—3 of FIG. 1;

FIG. 4 is a detail prospective view of a gear-and-rack mechanism for moving the swinging belt assembly toward and away from the bias cutter.

Figure 1:
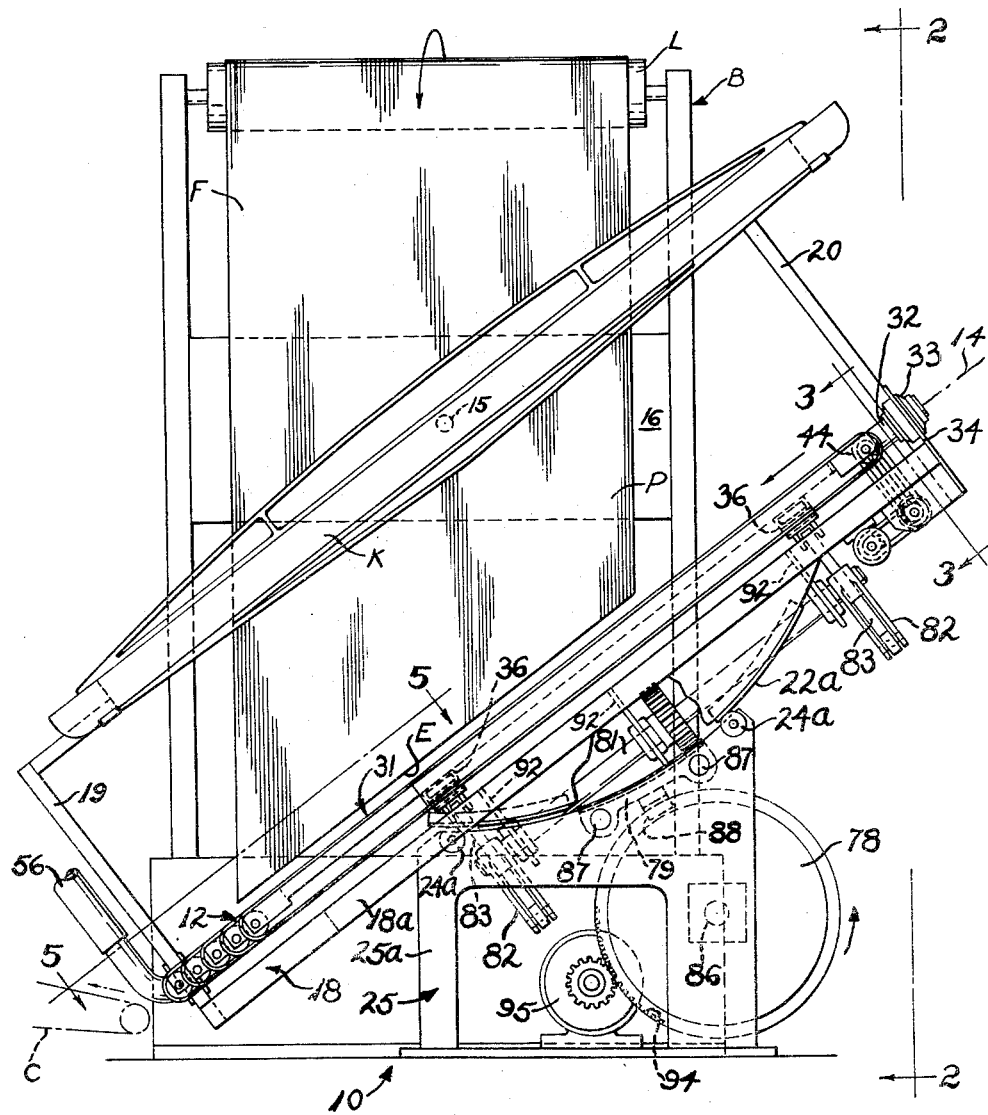
FIG. 1 is a front elevation of the transfer mechanism looking toward the front face of a bias cutter immediately behind the mechanism.

Referring to FIG. 1, the transfer mechanism 10 of this invention is used in association with a conventional type vertical bias cutter B, the transfer mechanism being positioned directly in front of the bias cutter. The bias cutter B itself forms no part of the present invention except to the extent that the transfer mechanism 10 operates cooperatively with the bias cutter as hereinafter explained. Inasmuch as the structural details of such bias cutters are so well known, these details are not shown in the drawings.

The features of the bias cutter B pertinent to this invention include a main feed roll L over which a wide strip of cord fabric F is fed so that it hangs vertically down the front face of the bias cutter and through a knife mechanism K. In accordance with the usual operation of such bias cutters, the fabric F is fed intermittently downward about roll L until the lower edge E of the fabric reaches about the position shown in FIG. 1, below the knife mechanism K. Then the knife mechanism is operated to clamp the adjoining region of the fabric and sever a piece P of the fabric hanging below the knife mechanism K from the main strip F.

The transfer mechanism 10 of this invention includes a swinging belt assembly 12 which is hinged at its inside edge along an axis 14 (see also FIGS. 2 and 5) so that the belt assembly is adapted to be swung into a vertical position (see FIG. 3) to engage and receive fabric piece P as it is cut off by knife K. Then, while holding piece P, on its stock-engaging side, the belt assembly is swung downwardly about its axis 14 away from the bias cutter back into its FIG. 1 position, wherein the piece P lies on conveyor 12 in a plane at right angles to the vertical plane in which it was cut. After reaching the latter position, the transfer mechanism 10 then operates to feed the piece P forwardly on the belt assembly to a receiving conveyor C of any suitable form indicated schematically in FIG. 1, which in turn may deliver the piece to a splicing mechanism (not shown) where the piece P and others like it may be spliced into a continuous strip with cords running on the bias, so that the fabric is suited for tire building operations; or the piece P may be conveyed to any other location in which it is to be used.

To provide for cutting fabric pieces P at different bias angles, the knife mechanism K of the bias cuter is mounted for angular adjustment relative to the feeding direction of fabric strip F on a horizontal pivot 15 in a plate 16 forming part of the main frame of the bias cutter. The swinging belt assembly 12 is in turn connected to the knife mechanism K by a frame 18 as hereinafter explained so that the axis 14 of the hinge of the swinging conveyor 12 (see FIG. 5) is maintained parallel to the knife mechanism K at any position of the knife mechanism in its range of adjustment relative to the fabric F.

Figure 5:
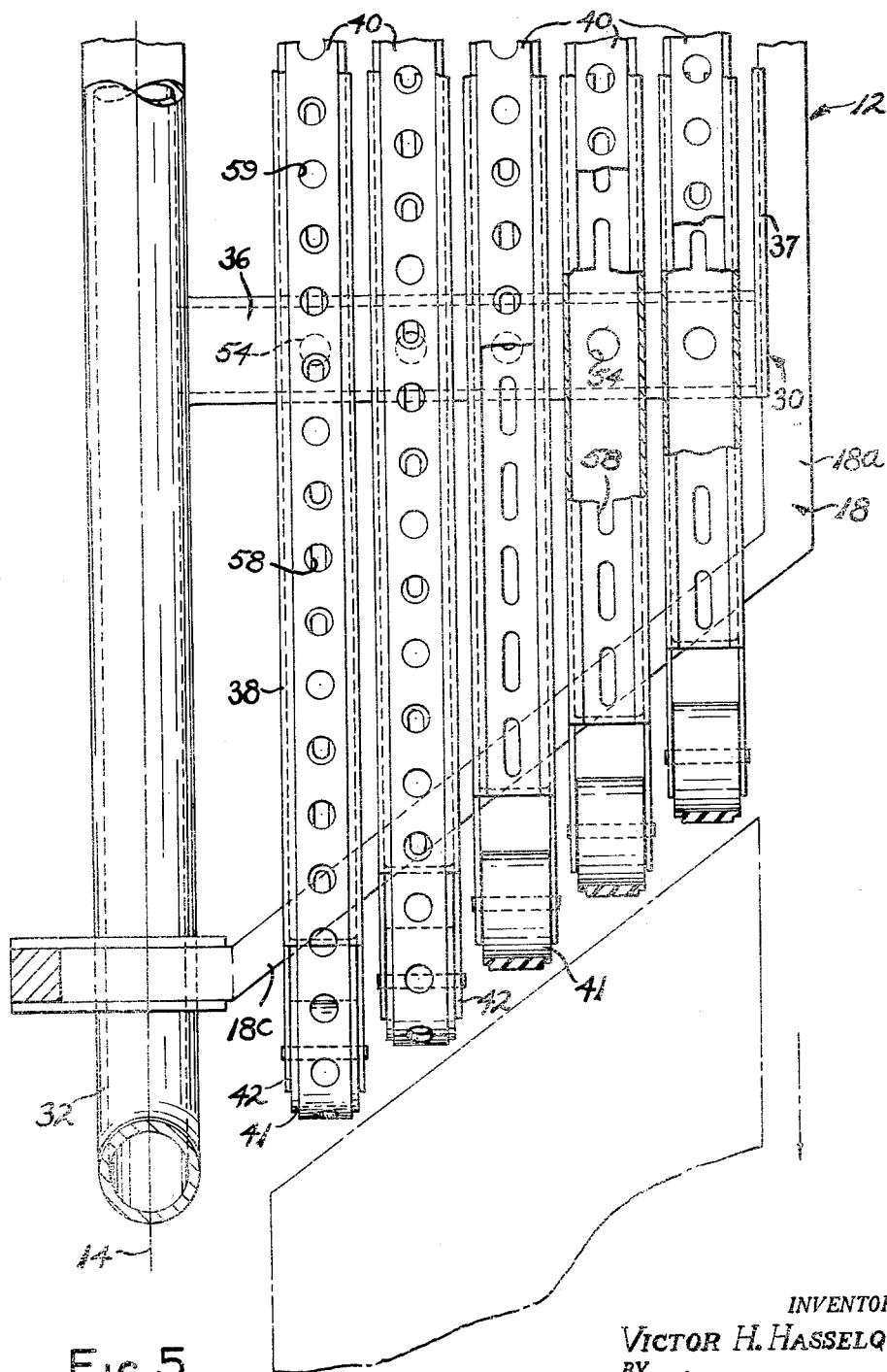
FIG. 5 is a detail view taken along the line 5—5 of FIG. 1.

The frame 18 which supports the belt assembly 12 is stationary relative to the swinging belt assembly 12 and is best shown in FIGS. 1 and 5. The frame 18 is rigid and has an outer side rail 18a and an inner parallel side rail 18b, both running the length of the conveyor and interconnected by transverse end rails 18c. The opposite ends of the inner rail 18b are rigidly fastened to links 19 and 20 which depend from opposite ends of the knife mechanism K. Accordingly, whenever the angular position of knife mechanism K is adjusted about pivot 15, frame 18 as a whole is also moved arcuately about pivot 15 to change the angle at which the belt assembly 12 is inclined in FIG. 1 relative to the horizontal.

Frame 18 is additionally supported for the foregoing arcuate adjustment by a pair of curved tracks 22a and 22b integrally mounted on outer and inner rails 18a and 18b, respectively, of the frame 18. Track 22a shows in FIG. 1 (partly broken away) and the end edges of both these tracks show in FIG. 2. These tracks are parallel to each other, and each is circularly curved on a radius which has pivot 15 as its center. The tracks 22a and 22b are engaged with pairs of rollers 24a and 24b, respectively, which are mounted on a stationary base frame 25. As shown in FIGS. 1 and 2, frame 25 includes two laterally spaced side uprights 25a and 25b. The upper edge of each upright is concavely curved to the same shape as the tracks 22a and 22b associated respectively therewith. Referring to FIG. 1, rollers 24a are mounted at the upper corners of the outer upright 25a so that they engage track 22a. The rollers 24b are mounted in the same location on the inner upright 25b to engage track 22b. In the FIG. 1 position of the mechanism, the frame 18 is inclined upwardly from the horizontal at about its maximum angle, and it will be evident that as the knife mechanism K is adjusted in a clockwise direction about pivot 15, the angle of incline of frame 18 will be reduced and the tracks 22a and 22b will also move clockwise about pivot 15 relative to the uprights 25a and 25b on the rollers 24a and 24b.

The belt assembly 12 has a frame 30 (FIG. 5) hinged for swinging relative to frame 18 on axis 14 so that the belt assembly may be swung from a position parallel to the frame 18 in FIG. 1 to a position at right angles to it to bring the upper fabric-engaging face 31 of the belt assembly against the fabric piece P, as it is severed by the knife mechanism K. The swingable frame 30 of the belt assembly includes a tube 32 which is journalled in its lower or left end in FIG. 1 in link 19 by bushing 19a, and is journalled at its upper end in a bushing 33 in a gusset plate 34 (see FIG. 2) fastened to frame 18 and link 20. Near the pivotal connections of the tube 32 there are two rigid parallel tubular bars 36 projecting laterally from tube 32 and their outer ends are fastened rigidly together by an outer frame piece 37 (FIG. 5 and FIG. 1). Bridging across the two bars 36 and parallel to the hinge tube 32 are a series of belt guide tubes 38 each of which is integrally fastened (preferably by welding) to the bars 36. Bars 36 are also preferably welded to tube 32.

A series of narrow endless belts 40 (partly broken away in FIG. 5) are trained endlessly lengthwise around the guide tubes 38. At the lower end of the belt assembly 12 near take-off conveyor C these belts are trained about separate spools 41 which are journalled between flanges 42 projecting from the ends of each guide tube 38. At the upper or opposite end of the belt assembly 12 these belts are trained collectively about a common drive roll 44, one end of which is journalled in the outer frame piece 37 and the other end in a mounting flange 45 near the hinge tube 32 (see FIG. 3).

FIG. 3 best shows the cross section of the driving belts as well as the belt guide tubes 38. Each tube 38 is rectangular in cross section and has an upper side 48 on which the upper reach 49 of its respective belt slides as the belt is driven endlessly. The upper side edges of each belt are rabbeted to fit under inwardly directed flanges 51 along the top corners of each tube to keep the upper reach of the belt snugly but slidably engaged with the upper side 48 of the guide tube. The lower reach 52 of each belt extends along the lower side of each guide tube 38 and under the cross supporting tubes 36 between its respective spool 41 and the common drive roll 44.

The belt assembly 12 uses vacuum to engage and hold the fabric piece P on the fabric-engaging face 31 of the assembly while the assembly is swung away from the bias cutter. For this reason the hinge tube 32, transverse bars 36 and the belt guide tubes 38 are all enclosed hollow members, and their interiors are in communication one with another. At the junction of each cross bar 36 with each belt guide tube 38 the interior of these tubes is communicated by holes 54 as shown in FIGS. 3 and 5. Also the interior of each cross bar 36 is in communication at 55 with the interior of hinge tube 32 at its junction therewith. The interior of tube 32 has a connection 56 (FIG. 1) for attachment to a suitable flexible hose (not shown) from a source of sub-atmospheric pressure. Through such hose connection the interiors of these members 32, 36 and 38 are evacuated and the vacuum is in turn communicated to the fabric engaging face 31 of the belts 40 by a series of slots 58 in the upper side 48 of the belt guide tubes 38, and perforations 59 through the belts 40. The spacing of the perforations 59 in the belts 40 and the size of the slots 58 in the tubes 38 are selected so that no matter where the belts are stopped relative to their respective tubes, at least some of the perforations 59 in the belt will be in register with some of the slots 58. Since the upper reaches of the belts are held snugly against the tubes 38 by flanges 51, the effect of the vacuum will be concentrated at the holes 59 in the belt to hold the fabric piece P firmly as the belt assembly is swung away from the bias cutter.

The belts 40 are driven so that their upper reaches 49 move lengthwise toward take-off conveyor C only when the belt assembly 12 is in its FIG. 1 position away from the bias cutter. A preferred form of drive for these belts is best shown in FIG. 3. The main component of this drive is a clutch 60 consisting of a driving member 60a and a driven member 60b. The driving member 60a is biased forwardly by a spring 62 and feather keyed at 63 to a tube 64 journalled in brackets 65 on inner rail 18b of the frame 18. Tube 64 is adapted for rotation through a chain-and-sprocket drive 66 connecting with a motor 67 (see FIG. 2) mounted on rail 18b.

The driven member 60b of clutch 60 is journalled in bearing 69 in a gusset plate 70 fastened to and depending from the swinging frame 30 of the belt assembly 12. The driven member 60b in turn is engaged through a chain-and-sprocket drive 71 with the drive roll 44 over which the belts 40 are trained at the upper end of the swinging frame.

When the belt assembly 12 is swung to its vertical position (dotted in FIG. 3) to receive fabric piece P, the driven clutch member 60b is swung upward away from driver 60a to a position in which the engaging face 73 of the driven member is at almost right angles to the corresponding engaging face 74 of the driver 60a. Then when the belt assembly is swung back to its forward feeding position, the engaging face 73 of the driven member is brought into re-engagement with face 74 of the driving member.

Preferably these engaging faces 73 and 74 are serrated to provide for positive driving engagement between these members. Also the biasing action of spring 62 on the driving member 60a provides for tight engagement of the clutch parts when they are brought into engagement.

Drive motor 67 is stopped when the clutch members are brought into engagement. Preferably the motor 67 is timed (by appropriate mechanism not shown) to operate synchronously with the take-off conveyor means C. Thus motor 67 will operate in proper sequence with the other components of the system to drive the belts 40 forwardly after the swinging belt assembly reaches its FIG. 1 position.

The swinging motion of the frame 30 of the belt assembly about the hinge axis 14 is effected through a special drive mechanism best shown in FIG. 4 and which consists of a barrel cam 78, an arcuately curved rack 79 reciprocated by the cam, a gear 80 rotated by the rack, a shaft 81, and operating arms 83 pivotally connected to the cranks and to the swinging frame 30 of belt assembly 12.

Referring to FIGS. 1 and 2, barrel cam 78 is mounted on a shaft 86 journalled in uprights 25a and 25b of the stationary base frame 25. Rack 79 is slidably supported on two parallel rods 87 fixed between uprights 25a and 25b and has a cam follower 88 on its lower side riding in the cam groove 90 of cam 78. Groove 90 is shaped so that on rotation of cam 78, the rack 79 is reciprocated between uprights 25a and 25b axially of the cam along rods 87.

The teeth of rack 79 are transverse to its direction of reciprocation. Accordingly the reciprocation of rack 79, in mesh with gear 80, turns gear 80 which in turn rocks shaft 81 and the cranks 82 at the end of shaft 81. Shaft 86 is journalled for rotation in three gusset plates 92 each fastened to frame 18.

The rocking motion imparted to cranks 82 in turn moves operating arms 83 connected to the cranks so that these arms are thrust up and down, thereby swinging frame 30 about its hinge tube 32 between the full line and the dotted line position shown in FIG. 3. The upper ends of operating arms 83 are attached to brackets 93 (FIG. 1) on the bottom of cross bars 36 of the swinging frame 30 through which brackets the lower reach of the adjoining belt passes to avoid interfering with the belt. More particularly, the parts are so proportioned that in one-half revolution of cam 78 from the position shown in FIG. 2, rack 79 is moved on rods 87 to a position close to upright 25b, thereby rotating gear 80 and cranks 82 counterclockwise to extend arms 83 and swing frame 30 of the belt assembly into its vertical position. In the second half revolution of cam 78 the parts are returned to their FIGS. 1 and 2 positions.

Cam 78 is driven by suitable gearing 94 from a motor 95. The motor is preferably operated intermittently in timed sequence with the operation of the bias cutter and the take-off conveyor.

The rack 79 is arcuately curved concavely in the direction in which its teeth extend so that gear 80 remains in mesh with the rack sliding along it to different positions on the rack whenever the main frame 18 and knife mechanism K is adjusted to different bias cutting angles. The arcuate length of the rack is selected so that the gear 80 remains in mesh with it throughout the range of adjustment of frame 18 on tracks 22a, 22b. Referring to FIG. 1, when knife mechanism K and frame 18 are adjusted in a counterclockwise direction about pivot 15, the tracks 22a and 22b slide downwardly on their rollers 24a, 24b relative to stationary base 25, and gear 80 is moved with the frame 18 and swinging frame 30 axially leftward relative to rack 79 to a new location on the rack to the left of the illustrated location. Gear 80 remains in mesh with rack 79 during such movement. The curvature of rack 79 is arcuate on a radius with a center at pivot 15. The advantage of this construction is that the operation of the swinging frame 30 is positive and remains uneffected regardless of the adjusted position of the transfer mechanism on its base 25.

To summarize the operation of the mechanism, a cycle of operation may start with the downward feeding of the fabric strip F below the knife mechanism K. This fabric feeding operation may be started immediately after the belt assembly 12 has been swung away from the fabric at the conclusion of the prior operating cycle. As soon as edge E of the fabric reaches its FIG. 1 position, the cam 78 is preferably rotated to swing the belt assembly into its vertical position against the fabric piece P. The belt assembly preferably waits in its vertical position with its fabric-engaging side 31 against piece P until the knife of mechanism K severs piece P. Through the vacuum connection 56 the fabric piece P is held against the belt assembly during the cut. In this vertical position of the belt assembly, clutch 60 (FIG. 3) is disengaged so that the belts 40 are stopped.

As soon as the knife travel is complete, cam follower 88 is driven to reverse the motion of rack 79 and hence swing the belt assembly with the ply piece P thereon back into its FIG. 1 retracted position, the piece being held firmly on the belts by the vacuum connection.

Clutch 60 is reengaged when the belt assembly arrives at its retracted position, and motion of cam follower 88 is stopped (or at least dwells). Then motor 67 is started to drive clutch 60 and belt drive roll 44 so that the upper reaches of belts 40 and the fabric piece P thereon are advanced forwardly toward conveyor C relative to the guide tubes 38. Since the perforations in the belt are always in register with some of the slots 58 of guide tube 38, the vacuum connection to tubes 38 keeps the piece P positioned accurately on the belts.

The piece P eventually passes onto the take-off conveyor and the motor 67 driving the belts is appropriately timed to stop the belts when the piece is wholly transferred to conveyor C. In the meantime, the downward feeding operation of fabric F on the bias cutter has commenced and is substantially complete. Therefore cam follower 88 is again acted upon to swing belt assembly 62 upward against a new fabric piece P, and a new operating cycle is commenced.

Adjustment of the knife mechanism K to different bias angles automatically adjusts the position of the transfer mechanism relative to its base 25 so that the hinge axis 14 of the swinging conveyor always remains parallel with the path traversed by the knife of mechanism K in cutting fabric F.

Variations in the structure disclosed may be made within the scope of the appended claims.

I claim:

1. Apparatus for receiving and transferring bias cut fabric pieces from the cutting mechanism of a bias cutter, said apparatus comprising a belt assembly pivotally mounted along one edge of the assembly for swinging motion toward and away from a fabric sheet at the bias cutter, said belt assembly including a stock-engaging side which is brought by said swinging motion of the assembly against said fabric to receive a piece of said fabric severed by the bias cutter; means for swinging said belt assembly which means include an arm pivotally connected to said assembly, a crank pivotally connected to said arm and rotatably mounted on a frame relative to which said belt assembly is mounted for said swinging motion, and means for rotating said crank to move said arm to swing said belt assembly, means for gripping and holding a bias cut fabric piece against said stock-engaging side of said belt assembly during said swinging motion of the belt assembly away from the bias cutter, and means for operating said belt assembly to advance said fabric piece lengthwise of the belt assembly when the belt assembly is swung to a position in which the fabric engaging side is remote from the bias cutter.

2. Apparatus according to claim 1 wherein said means for rotating said crank is a gear connected to said crank on said frame, a rack mounted for reciprocation in mesh with said gear to rotate said rack, and means for reciprocating said gear.

3. Apparatus according to claim 2 wherein said rack-reciprocating means is a cam having a follower on said rack.

4. Apparatus for receiving and transferring bias cut fabric pieces from the cutting mechanism of a bias cutter, said apparatus comprising a frame, a fabric pick-up assembly hinged to the frame along one side of the assembly for swinging movement relative to the frame toward and away from a fabric sheet at the bias cutter, means on the frame for swinging said assembly, a base on which said frame is mounted, means supporting said frame on said base for arcuate adjustment of the entire frame relative to the base to maintain the pivotal connection of said assembly parallel to the cut edges of the fabric at the bias cutter, and drive means in said base connected with said means on the frame for swinging said assembly, said drive means being adapted to maintain connection with the latter said means throughout the range of adjustment of the frame relative to the base.

5. Apparatus according to claim 4 wherein said assembly-swinging means on said frame is a gear driven linkage, and wherein said drive means in the base includes a reciprocable rack meshed with said gear, said rack being curved to conform to the arcuate adjustment path of said frame so that said gear may be moved axially to different locations on said rack while in mesh therewith in conformance with the position to which said frame is adjusted.

6. Apparatus according to claim 4 wherein said frame has curved tracks engaging said base on which tracks the frame is adjustably supported.

References Cited in the file of this patent
UNITED STATES PATENTS 2,754,953     Groncy _____ July 17, 1956

UNITED STATES PATENT OFFICE
CERTIFICATE OF CORRECTION

Patent No. 3,019,018                  January 30, 1962

Victor H. Hasselquist

It is hereby certified that error appears in the above numbered patent requiring correction and that the said Letters Patent should read as corrected below.

Column 6, line 54, for "rack" read -- gear --; line 55, for "gear" read -- rack --.

Signed and sealed this 21st day of August 1962.

(SEAL)
Attest:

ESTON G. JOHNSON
Attesting Officer

DAVID L. LADD
Commissioner of Patents